(12) United States Patent
Smitherman et al.

(10) Patent No.: US 11,940,331 B2
(45) Date of Patent: Mar. 26, 2024

(54) PACKAGES FOR WIRELESS TEMPERATURE SENSOR NODES

(71) Applicant: Analog Devices, Inc., Norwood, MA (US)

(72) Inventors: Charles D. Smitherman, Greensboro, NC (US); Michael J. Flaherty, Halifax, MA (US); Eugene Oh Hwang, Melrose, MA (US)

(73) Assignee: Analog Devices, Inc., Wilmington, MA (US)

( * ) Notice: Subject to any disclaimer, the term of this patent is extended or adjusted under 35 U.S.C. 154(b) by 599 days.

(21) Appl. No.: 17/026,094

(22) Filed: Sep. 18, 2020

(65) Prior Publication Data

US 2021/0239539 A1    Aug. 5, 2021

Related U.S. Application Data

(60) Provisional application No. 62/970,560, filed on Feb. 5, 2020.

(51) Int. Cl.
*G01K 1/18* (2006.01)
*G01K 1/024* (2021.01)
*G01K 1/08* (2021.01)

(52) U.S. Cl.
CPC .............. *G01K 1/18* (2013.01); *G01K 1/024* (2013.01); *G01K 1/08* (2013.01)

(58) Field of Classification Search
CPC ............. G01K 1/18; G01K 1/024; G01K 1/08
See application file for complete search history.

(56) References Cited

U.S. PATENT DOCUMENTS

| 7,800,078 | B2 | 9/2010 | Colvin, Jr. et al. |
| 8,477,070 | B2 | 7/2013 | Pettus et al. |

(Continued)

FOREIGN PATENT DOCUMENTS

| CN | 201269786 Y | 7/2009 |
| CN | 101276430 B | 4/2011 |

(Continued)

OTHER PUBLICATIONS

Lahokallio, Performance and Reliability of Polymer-based on Sensor Packages at High Temperatures. Tampere University of Technology. 2017; 1475:110 pages.

*Primary Examiner* — Mirellys Jagan
(74) *Attorney, Agent, or Firm* — Wolf, Greenfield & Sacks, P.C.

(57) ABSTRACT

Packages for wireless temperature sensor nodes are described. These wireless temperature sensor nodes are suitable for sensing the temperature of remote objects, such as objects that are difficult to access. These packages are designed to enhance the sensor's ability to sense temperature. For example, these packages may be designed to provide a low thermal resistance path between the object and the temperature sensor, a high thermal resistance between an antenna of the wireless temperature sensor node and the object, and at least in some embodiments, immunity to vibrations. One such package includes means for providing a thermal conductive path from the temperature sensor to a thermally conductive support in contact with the object (for example with a thermal resistance less than 10 K/W), and means for thermally conductively decoupling the circuit board from the thermally conductive support (for example by at least 100 K/W).

14 Claims, 13 Drawing Sheets

(56) References Cited

U.S. PATENT DOCUMENTS

| | | | |
|---|---|---|---|
| 9,729,193 B2 | 8/2017 | Joshi et al. | |
| 10,386,246 B2 | 8/2019 | Disselnkoetter et al. | |
| 2008/0030353 A1 | 2/2008 | O'Toole et al. | |
| 2014/0121557 A1* | 5/2014 | Gannon | G01K 1/024 600/549 |
| 2017/0016773 A1* | 1/2017 | Arai | G01K 11/22 |

FOREIGN PATENT DOCUMENTS

| | | | | |
|---|---|---|---|---|
| CN | 106104236 A | | 11/2016 | |
| CN | 106137144 A | * | 11/2016 | |
| CN | 206177467 U | | 5/2017 | |
| CN | 107004153 A | | 8/2017 | |
| CN | 207964117 U | | 10/2018 | |
| CN | 109253815 A | | 1/2019 | |
| CN | 110072443 A | | 7/2019 | |
| DE | 102014116451 A1 | | 5/2015 | |
| JP | 2001357369 A | | 12/2001 | |
| JP | 2005114558 A | | 4/2005 | |
| JP | 2017156123 A | | 9/2017 | |
| WO | WO-2016108888 A1 | * | 7/2016 | A61B 5/0008 |
| WO | WO-2018186748 A1 | * | 10/2018 | A61B 5/0008 |

* cited by examiner

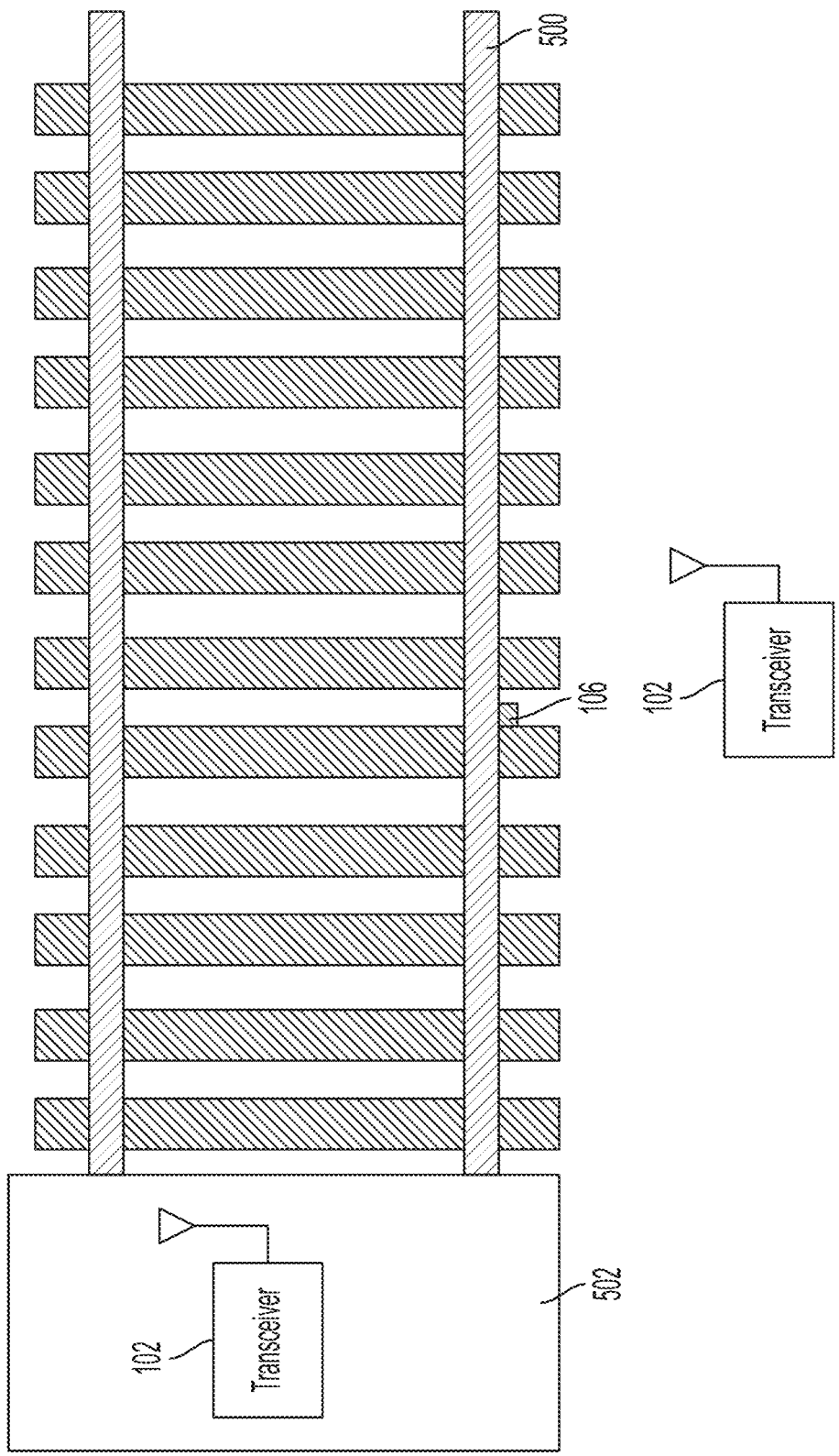

PACKAGES FOR WIRELESS TEMPERATURE SENSOR NODES

CROSS-REFERENCE TO RELATED APPLICATIONS

This application claims the benefit under 35 U.S.C. § 119(e) of U.S. Provisional Application Ser. No. 62/970,560, entitled "PACKAGES FOR WIRELESS TEMPERATURE SENSOR NODES," filed on Feb. 5, 2020, which is hereby incorporated by reference herein in its entirety.

FIELD OF THE DISCLOSURE

The technology described in the present application relates to wireless temperature sensor nodes.

BACKGROUND

Wireless temperature sensor nodes are often deployed at remote locations to monitor the temperature of the environment or the temperature of an object, such as piece of equipment. Some wireless temperature sensor nodes are equipped with wireless transceivers for transmitting measurement data to a base station.

SUMMARY OF THE DISCLOSURE

Some embodiments are directed to packages for wireless temperature sensor nodes. These wireless temperature sensor nodes are suitable for sensing the temperature of remote objects, such as objects that are difficult to access. These packages are designed to enhance the sensor's ability to sense temperature. For example, these packages may be designed to provide a low thermal resistance path between the object and the temperature sensor, a high thermal resistance between an antenna of the wireless temperature sensor node and the object, and at least in some embodiments, immunity to vibrations. One such package includes means for providing a thermal conductive path from the temperature sensor to a thermally conductive support in contact with the object (for example with a thermal resistance less than 10 K/W), and means for thermally conductively decoupling the circuit board from the thermally conductive support (for example by at least 100 K/W).

Some embodiments are directed to a package for a wireless temperature sensor node. The package comprises a circuit board; a temperature sensor disposed on the circuit board; an antenna electrically coupled to the temperature sensor; and a thermally conductive support. The thermally conductive support is in thermal contact with the temperature sensor and, the thermally conductive support is thermally conductively decoupled from the circuit board.

Some embodiments are directed to a package for a wireless temperature sensor node. The package comprises a circuit board; one or more thermally insulating members; a temperature sensor disposed on the circuit board; an antenna electrically coupled to the temperature sensor; and a thermally conductive support. The thermally conductive support is in thermal contact with the temperature sensor and, the circuit board is coupled to the thermally conductive support through the one or more thermally insulating members.

Some embodiments relate to a package for a wireless temperature sensor node. The package comprises a circuit board; a temperature sensor disposed on the circuit board; an antenna electrically coupled to the temperature sensor; a thermally conductive support; and means for providing a thermal path, from the temperature sensor to the thermally conductive support, with a thermal resistance less than 10 K/W and for thermally conductively decoupling the circuit board from the thermally conductive support by at least 100 K/W.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 5A is a schematic diagram illustrating a wireless temperature sensor node used in the context of railway applications, in accordance with some non-limiting embodiments.

DETAILED DESCRIPTION

I. Overview

Figure 1:
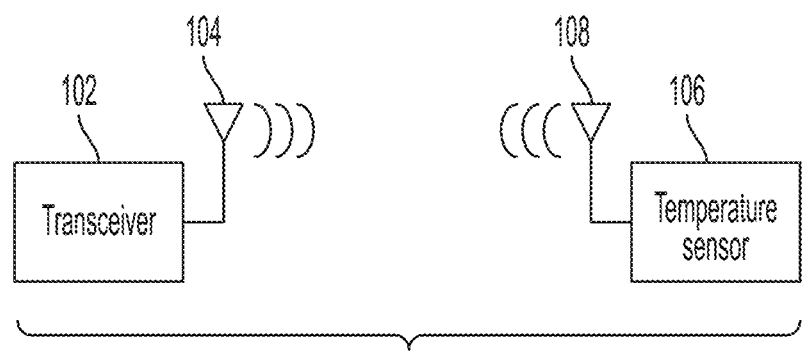
FIG. 1 is a schematic diagram illustrating a system including a transceiver and a temperature sensor, in accordance with some non-limiting embodiments.

Aspects of the present application relate to packages for wireless temperature sensor nodes configured to sense the temperature of an object. These packages are designed to provide: 1) a low thermal resistance path between the object and the temperature sensor, 2) a high thermal resistance between an antenna of the wireless temperature sensor node and the object, and 3) at least in some embodiments, immunity to vibrations. Further aspects of the present application relate to packages designed to exhibit a relatively low thermal mass, thereby reducing thermal inertia and allowing the temperature sensor to sense quick temperature fluctuations that may arise due to varying environmental conditions.

Wireless temperature sensor nodes of the types described herein include sensors for sensing the temperature of an object and antennas for transmitting information indicative of the sensed temperature to base stations. The ability to transmit data to base stations makes these wireless temperature sensor nodes particularly suitable for sensing the temperature of remote objects, such as objects that are difficult to access.

Applicant has appreciated that it may be desirable, at least in some circumstances, to package a temperature sensor together with an antenna in a small footprint to increase the range of applications in which the wireless temperature sensor node can be used. Having a small footprint can enable, for example, placement of wireless temperature sensor nodes in small interstices to sense the temperature of dense mechanical equipment.

Applicant has appreciated, however, that packaging the temperature sensor and the antenna in a small footprint poses a challenge. During transmission of data with the antenna, the antenna inevitably produces heat. The heat produced by the antenna may inadvertently find a relatively short thermal conductive path leading to the object to be sensed, thereby artificially increasing the temperature of the object. The result is that the temperature sensed by the temperature sensor reflects not only the natural temperature of the object, but also the heat produced by the antenna. This effect reduces the accuracy of the measurement.

Aspects of the present application relate to packages designed to increase the resistance of the thermal conductive path from the antenna to the object to be sensed while at the same time reducing the resistance of the thermal conductive path from the object to the temperature sensor. In some embodiments, a package may de designed to include a thermally conductive support to be placed in physical contact with both the object to be sensed and the temperature sensor, thereby providing a low-resistance thermal path from the object to the temperature sensor. The thermally conductive support may be sized to contact a sufficiently large area of the object to enable sufficient heat transfer.

In some embodiments, the thermal resistance of the conductive path from the antenna to the object may be increased by interposing one or more thermally insulating members along this path. In some such embodiments, the antenna is placed on a circuit board and the circuit board is placed on the thermally conductive support. Instead of placing the circuit board directly in contact with the thermally conductive support, one or more thermally insulating members are interposed between the circuit board and the thermally conductive support, thereby reducing heat transfer between these two components.

Applicant has further appreciated that mechanical shocks and vibrations, arising for example due to motion of the object to be sensed, may cause loss of physical contact between the temperature sensor and the thermally conductive support and/or between the thermally conductive support and the object. This effect results in an undesirable increase in the thermal resistance. To make things worse, mechanical shocks and vibrations can also damage the package, thus reducing its lifetime. These problems are exacerbated in particularly harsh environmental conditions, where mechanical shocks and vibrations are frequent. This is the case, for example, in the context of railway applications, where a wireless temperature sensor node is placed in contact with a railway track, so that the temperature of the track can be sensed. Use of wireless temperature sensor nodes in the context of railway applications is described in detail further below. To obviate these problems, in some embodiments, compressible members may be used as shock absorbers. In some such embodiments, the thermally insulating members described above—which are configured to increase the resistance of the thermal path from the antenna to the object—are also compressible, thus serving a dual function.

As discussed above, a thermally conductive support may be sized to contact a sufficiently large area of the object to provide sufficient heat transfer. Applicant has further appreciated, however, that overly increasing the size of the thermally conductive support can be counterproductive. Making the thermally conductive support too large results in a large thermal mass, which in turn, results in a significant thermal inertia. In essence, the thermally conductive support is unable to follow quick variations in the temperature of the object to be sensed. This limitation is unacceptable in applications that require the ability to sense rapid temperature variations. Thus, in some embodiments, the size of a thermally conductive support is selected based on a trade-off consideration—the size is sufficiently large to provide a sufficiently large thermal contact with the object, but is also sufficiently small to limit the thermal mass. In some embodiments, this may involve designing the package support so that a portion of the package is conductive and a portion of the package is insulating. For example, in some such embodiments, a thermally insulating support encloses a thermally conductive support.

II. Wireless Temperature Sensor Nodes

FIG. 1 depicts a system including a transceiver 102 and a temperature sensor 106. The transceiver 102 is in communication with the temperature sensor 106 wirelessly. The transceiver 102 is coupled to at least one antenna 104 and the temperature sensor 106 is coupled to at least one antenna 108. Antennas 104 and 108 are in wireless communication with one another. In some embodiments, antenna 104 serves as both the transmit antenna and the receive antenna. In other embodiments, an antenna 104 serves as the transmit antenna, and another antenna 104 serves as the receive antenna. Similarly, antenna 108 may serve as both the transmit antenna and the receive antenna, or alternatively, there may a transmit antennas 108, and a separate receive antenna 108. Transceiver 102 and antenna 104 are collectively referred to herein as an "interrogator" or a "base station." Temperature sensor 106 and antenna 108 are collectively referred to herein as a "wireless temperature sensor node."

Temperature sensor 106 may be placed at a remote location for sensing the temperature of an object. Signals indicative of the sensed temperature may be transmitted to transceiver 102 via antenna 108. In some embodiments, transceiver 102 transmits an interrogation signal, and in response, temperature sensor 106 senses the temperature of an object and transmits a signal indicative of the sensed temperature back to transceiver 102 (or to another transceiver).

In some embodiments, the wireless temperature sensor node may be passive (e.g., without batteries or other power supplies), and in some such passive sensors, energy harvesters may be provided. Examples of energy harvesters include kinetic energy harvesters (e.g., from mechanical vibrations), thermal energy harvesters (e.g., from a temperature gradient), photovoltaic energy harvesters, and/or radio frequency energy harvesters. In some embodiments, sensor 106 is designed to harvest electromagnetic radiation collected with antenna 108. For example, sensor 106 may harvest energy from the same signal that interrogates the sensor.

In some embodiments, temperature sensor 106 includes a thermistor, a resistance temperature detector (RTD), a thermocouple and/or a semiconductor-based sensor, among other possible types of sensors. In some embodiments, sensor 106 comprises a resonant sensor. For example, sensor 106 may comprise a surface acoustic wave (SAW) sensor.

Figure 2A:
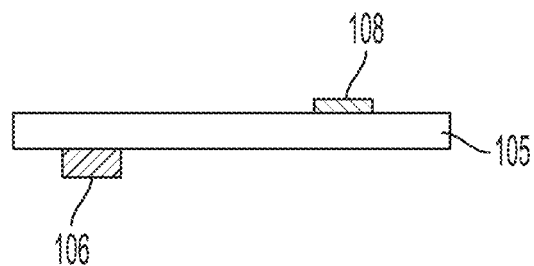
FIG. 2A is a schematic diagram illustrating an antenna and a temperature sensor disposed on opposite sides of a circuit board, in accordance with some non-limiting embodiments.
Figure 2B:
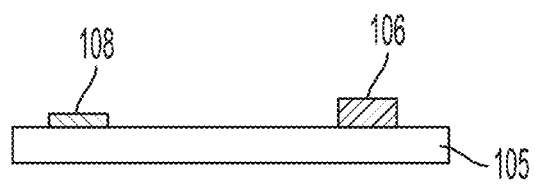
FIG. 2B is a schematic diagram illustrating an antenna and a temperature sensor disposed on the same side of a circuit board, in accordance with some non-limiting embodiments.

In some embodiments, antenna 108 and temperature sensor 106 are disposed on a common circuit board. The circuit board may be made of any suitable material and may be rigid or flexible. FIGS. 2A-2B illustrate two possible arrangements, though other arrangements are also possible. In the arrangement of FIG. 2A, temperature sensor 106 is disposed on one side of circuit board 105 and antenna 105 is disposed on the opposite side of circuit board 105. In the arrangement of FIG. 2B, temperature sensor 106 and antenna 108 are disposed on the same side of circuit board 105. Either way, circuit board 105 may include metal traces, wires, vias, or other electrically conductive paths for electrically coupling antenna 108 to temperature sensor 106. In this way, temperature sensor 106 can transfer electrical signals to antenna 108 that are indicative of the sensed temperature. In the illustrated embodiments, antenna 108 is shown as being implemented as an integrated antenna, such as a patch antenna, a microstrip antenna, a WiFi antenna, or a Bluetooth® antenna. However, not all embodiments are limited in this respect as other types of antennas, such as dipole antennas, may alternatively or additionally be used.

Although not illustrated in FIGS. 2A-2B, circuit board 105 may include additional components designed for processing signals generated by temperature sensor 106. For example, circuit board 105 may include an amplifier, a filter, an analog-to-digital converter, a processor, a memory, and a modulator.

III. Examples of Packages for Wireless Temperature Sensor Nodes

Figure 3A:
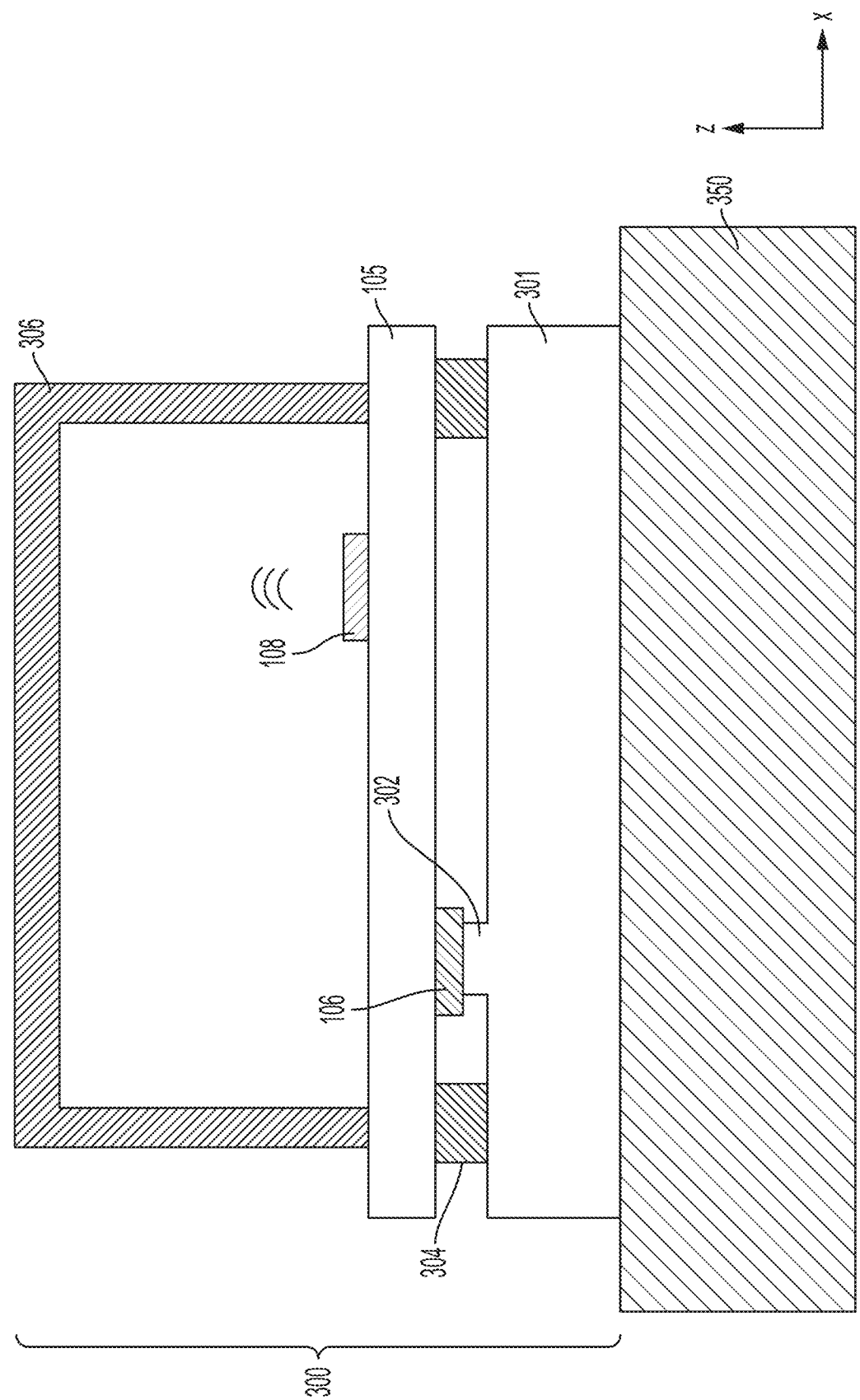
FIG. 3A is a schematic diagram illustrating a package for a wireless temperature sensor node, in accordance with some non-limiting embodiments.

Some embodiments relate to packages for wireless temperature sensor nodes designed to provide a low thermal resistance path between the object and the temperature sensor and a high thermal resistance between the antenna and the object. FIG. 3A illustrates an example of such a package, in accordance with some embodiments. Package 300 is disposed in contact with object 350—the object to be sensed. As such, package 300 enables sensing of the temperature of object 350. Package 300 includes circuit board 105, antenna 108, temperature sensor 106, thermally conductive support 301 and electrically transparent lid 306. Thermally conductive support 301 is made of (or at least includes) a thermally conductive material, such as copper, aluminum or steel. Thermally conductive support 301 is in contact with object 350.

In the example of FIG. 3A, temperature sensor 106 and antenna 108 are disposed on opposite sides of circuit board 105, though other arrangements are also possible. Lid 306 is made of a material that is electrically transparent—thus permitting transmission of electromagnetic radiation emitted by antenna 108. For example, lid 306 may be made of plastic or other electrically insulating materials. One side of circuit board 105 faces away from lid 306—temperature sensor 106 may be disposed on this side. The other side of circuit board 105 faces towards lid 306—antenna 108 may be disposed on this side.

Package 300 is designed to provide a low thermal resistance path between temperature sensor 106 and thermally conductive support 301, and to thermally decouple antenna 108 from thermally conductive support 301. Providing a low thermal resistance path between temperature sensor 106 and thermally conductive support 301 improves the sensor's ability to sense the temperature of object 350.

In some embodiments, a surface of temperature sensor 106 is in thermal contact with a portion of thermally conductive support 301 (for example, the exterior surface of the die hosting the temperature sensor may be in contact with a portion of thermally conductive support 301, or the actual portion of the temperature sensor that senses temperature may be in contact with a portion of thermally conductive support 301). As a result, there may be a thermal path, from temperature sensor 106 to thermally conductive support 301, with a thermal resistance less than K/W, less than 50 K/W or less than 100 K/W, among other possible values. In some embodiments, thermally conductive support 301 includes (or may otherwise be connected to) a thermally conductive protrusion 302. The protrusion may be made of the same material as thermally conductive support 301, or may be made of a different thermally conductive material. Thermally conductive protrusion 302 extends towards temperature sensor 106. In some embodiments, thermally conductive protrusion 302 contacts temperature sensor 106, thereby forming a low thermal resistance path between temperature sensor 106 and thermally conductive support 301.

Applicant has appreciated that heat generated by antenna 108 may inadvertently be conveyed to thermally conductive support 301. This can increase the temperature of thermally conductive support 301 (and/or the temperature of the object itself), which in turn, can lead to an increase in the temperature sensed by temperature sensor 106. The temperature increase caused by the heat generated by antenna 108 may be difficult to quantify, thereby distorting the sensor's ability to sense the temperature of object 350. In some embodiments, this effect may be limited by thermally conductively decoupling antenna 108 from thermally conductive support 301.

Such thermally conductive decoupling may be achieved by introducing an interruption in the heat conductive path between circuit board 105 and thermally conductive support 301. It should be appreciated that when a thermally conductive support is thermally conductively decoupled from a circuit board, there may still be heat exchange from circuit board 105 to thermally conductive support 301 by means other than thermal conduction, such as by thermal irradiation or thermal convection. Further, when a thermally conductive support is thermally conductively decoupled from a circuit board, there may still be heat exchange from circuit board 105 to thermally conductive support 301 by thermal conduction passing through temperature sensor 106. In some embodiments, thermally conductive decoupling a thermally conductive support from a circuit board may be achieved by avoiding direct contacts. In some embodiments, circuit board 105 may be thermally conductively decoupled from thermally conductive support 301 by at least 100 K/W, 500 K/W or 1000 K/W. That is, there are no thermal paths from circuit board 105 to thermally conductive support 301 with thermal resistances less than 100 K/W, 500 K/W or 1000 K/W. In some embodiments, there is virtually no thermal conduction between a thermally conductive support and a circuit board when these components are thermally conductively decoupled from one another.

In some embodiments, thermally insulating members 304 are interposed between circuit board 105 and thermally conductive support 301. Such thermally insulating members may be made of any material of low thermal conductivity, such as rubber or plastic. Circuit board 105 may rest on top of thermally insulating members 304, thereby avoiding any direct contact with thermally conductive support 301.

In some embodiments, thermally insulating members 304 are compressible. For example, thermally insulating members 304 may be made of an elastomeric material. Use of compressible members improves the package's immunity against vibrations—vibrations that may otherwise damage the electronic circuits of package 300 are absorbed by the compressible thermally insulating members 304. This is particularly useful in applications in which object 350 is expected to vibrate substantially. One such application is in the context of railway tracks, which is described in detail further below. Additionally, the ability to absorb mechanical vibrations reduces the likelihood that temperature sensor 106 loses contact with thermally conductive support 301 and that thermally conductive support 301 loses contact with object 350.

Figure 3B:
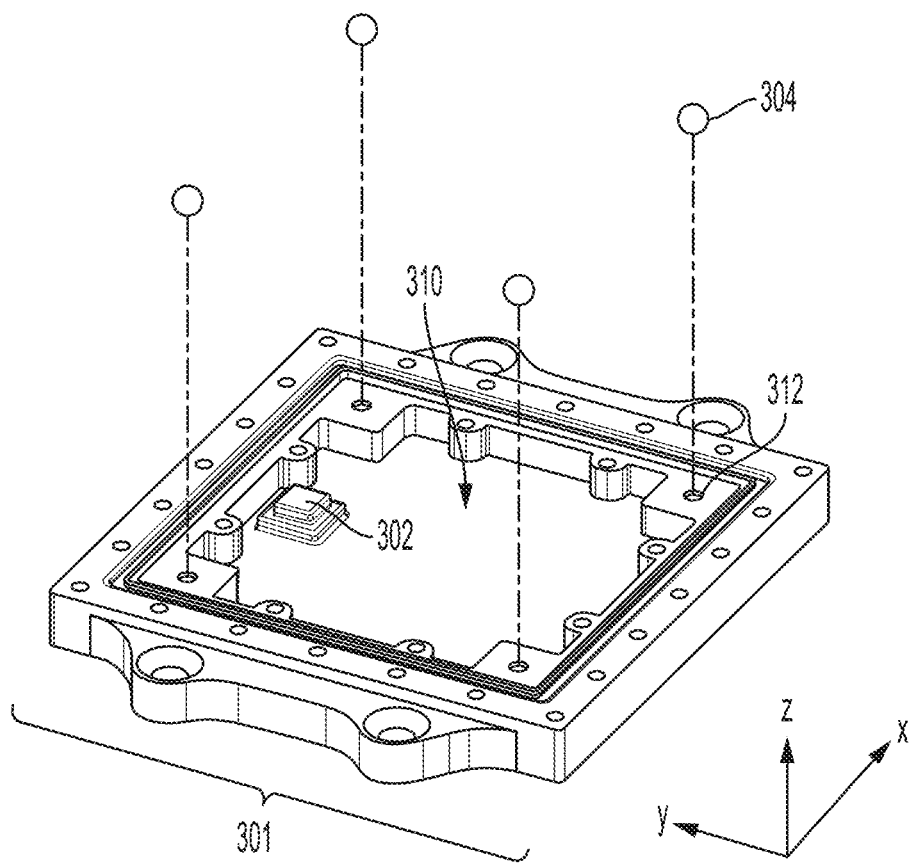
FIG. 3B is a schematic diagram illustrating a thermally conductive support that may be used in connection with the package of FIG. 3A, in accordance with some non-limiting embodiments.

FIG. 3B illustrates a possible implementation of thermally conductive support 301, in accordance with some embodiments. In this example, thermally conductive support 301 includes a thermally insulating base 310 on which protrusion 302 is formed. Protrusion 302 may be shaped so that its top surface is raised relative to thermally insulating base 310. Thermally conductive support 301 further includes receptacles 312, which in this example are shaped as circular cavities. Receptacles 312 may be sized to accommodate thermally insulating members 304. In this example, thermally insulating members 304 are o-ring elastomers, though other shapes are also possible. When thermally conductive support 301 is assembled as part of a package 300, circuit board 105 rests on the o-ring elastomers, thereby avoiding contact with thermally conductive support 301. Further, temperature sensor 106 is in contact with protrusion 302.

Figure 3C:
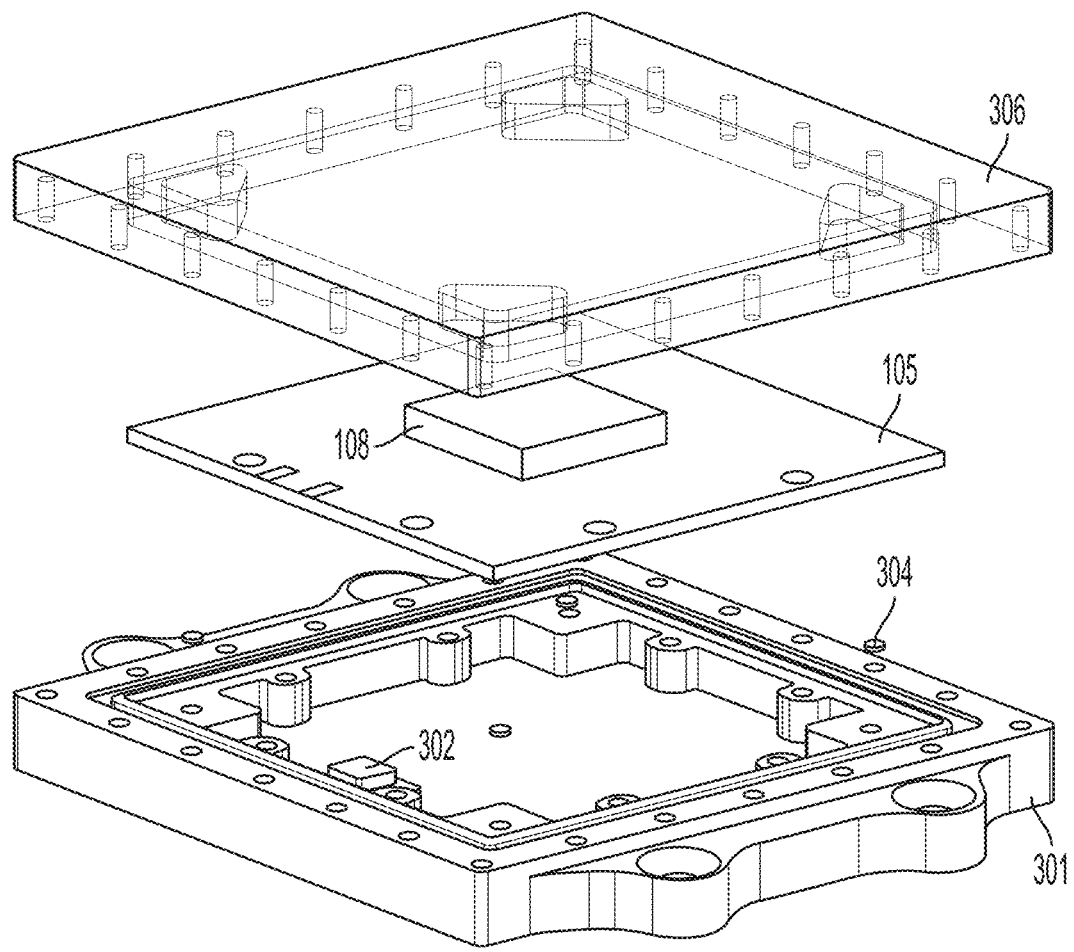
FIG. 3C is an exploded view of an implementation of the package of FIG. 3A, in accordance with some non-limiting embodiments.

FIG. 3C is an exploded view of an example of package 300, in accordance with some embodiments. This package includes a thermally conductive support 301, a circuit board 105, and an electrically transparent lid 306. Circuit board 105 includes antenna 108, and on the opposite side, temperature sensor 106. Protrusion 302 extends from the base of thermally conductive support 301. Thermally insulating members 304 are placed between thermally conductive support 301 and circuit board 105.

Figure 3D:
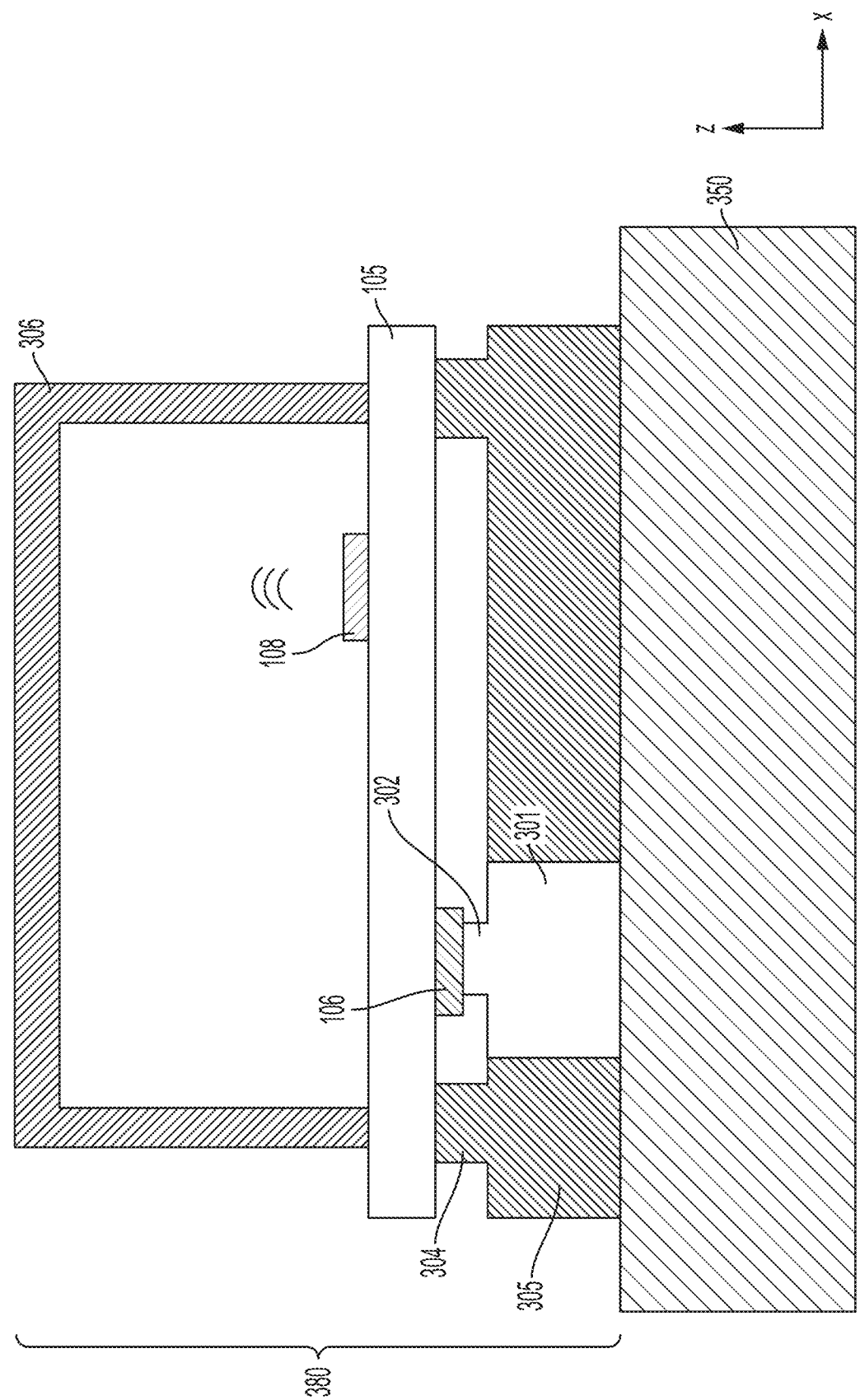
FIG. 3D is a schematic diagram illustrating another package for a wireless temperature sensor node, in accordance with some non-limiting embodiments.

FIG. 3D illustrates another example of a package for a wireless temperature sensor node, in accordance with some embodiments. Similar to package 300, package 380 is disposed in contact with object 350, and includes circuit board 105, antenna 108, temperature sensor 106, thermally conductive support 301 and electrically transparent lid 306. Thermally conductive support 301 is in contact with object 350. In addition, package 380 includes thermally insulating support 305, which may be made of any suitable thermally insulating material, such as plastic. Package 380 is designed so that circuit board 105 rests on thermally insulating support 305, instead of resting on thermally conductive support 301. This arrangement provides two benefits relative to the arrangement of FIG. 3A. First, it further increases the thermal resistance between antenna 108 and thermally conductive support 301. Second, it allows for a reduction in the size of thermally conductive support 301, and as a result, a reduction in the thermal mass of thermally conductive support 301. Reducing the thermal mass of thermally conductive support 301 enables the thermally conductive support 301 to follow quick variations in the temperature of object 350. This is particularly beneficial where the object is subject to rapidly varying conditions, but at the same time, the application requires real time or quasi-real time temperature measurements. Reducing the thermal mass of thermally conductive member 301 reduces the lag with which the temperature sensor senses variations in the temperature of object 350.

Figure 3E:
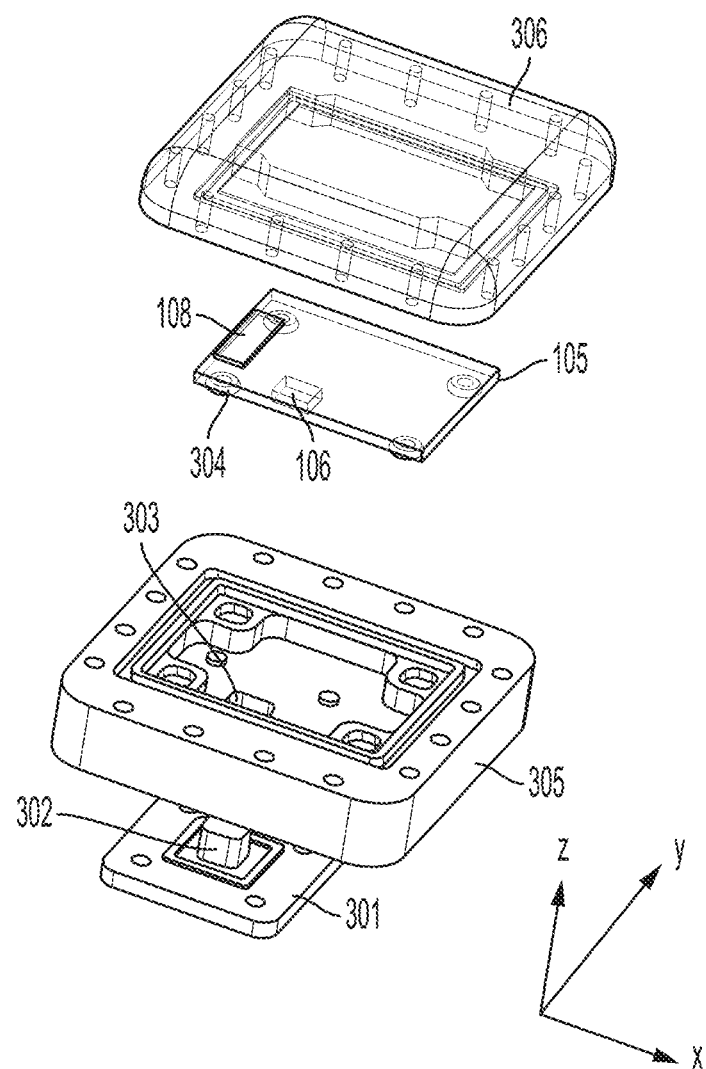
FIG. 3E is an exploded view of an implementation of the package of FIG. 3D, in accordance with some non-limiting embodiments.
Figure 3F:
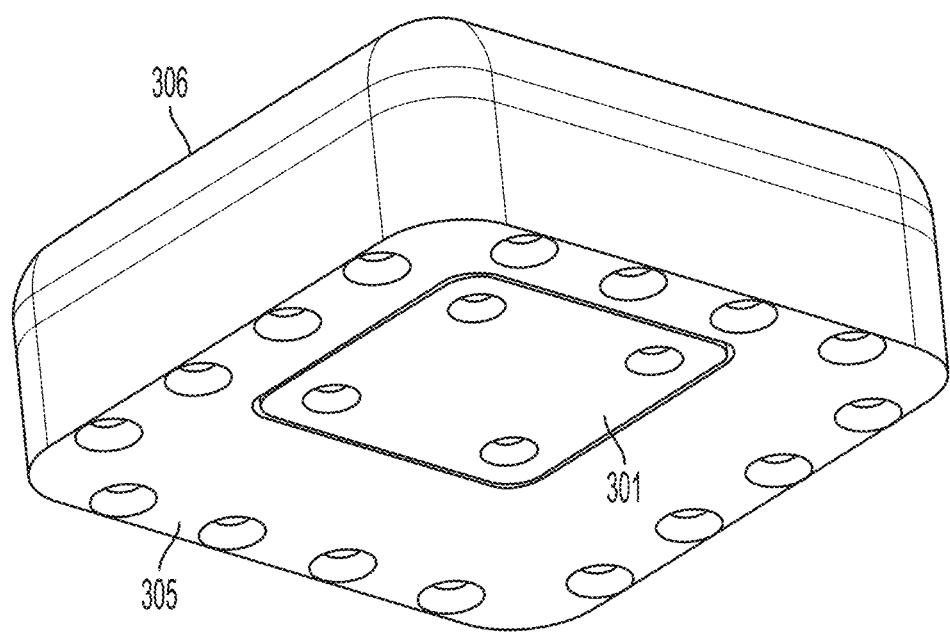
FIG. 3F is a bottom view of the implementation of FIG. 3E, in accordance with some non-limiting embodiments.

FIG. 3E illustrates a non-limiting example implementation of thermally conductive support 301, in accordance with some embodiments. In this example, protrusion 302 is inserted into a recess 303 formed through thermally insulating support 305. As in the example of FIG. 3B, thermally insulating members 304 are shaped as o-rings, though other shapes are also possible. FIG. 3F illustrates a bottom view of the package of FIG. 3E, in accordance with some embodiments. In this example, thermally insulating support 305 encloses thermally conductive support 301 when the supports are assembled together. More generally, thermally insulating support 305 may be disposed adjacent thermally conductive support 301.

Figure 4A:
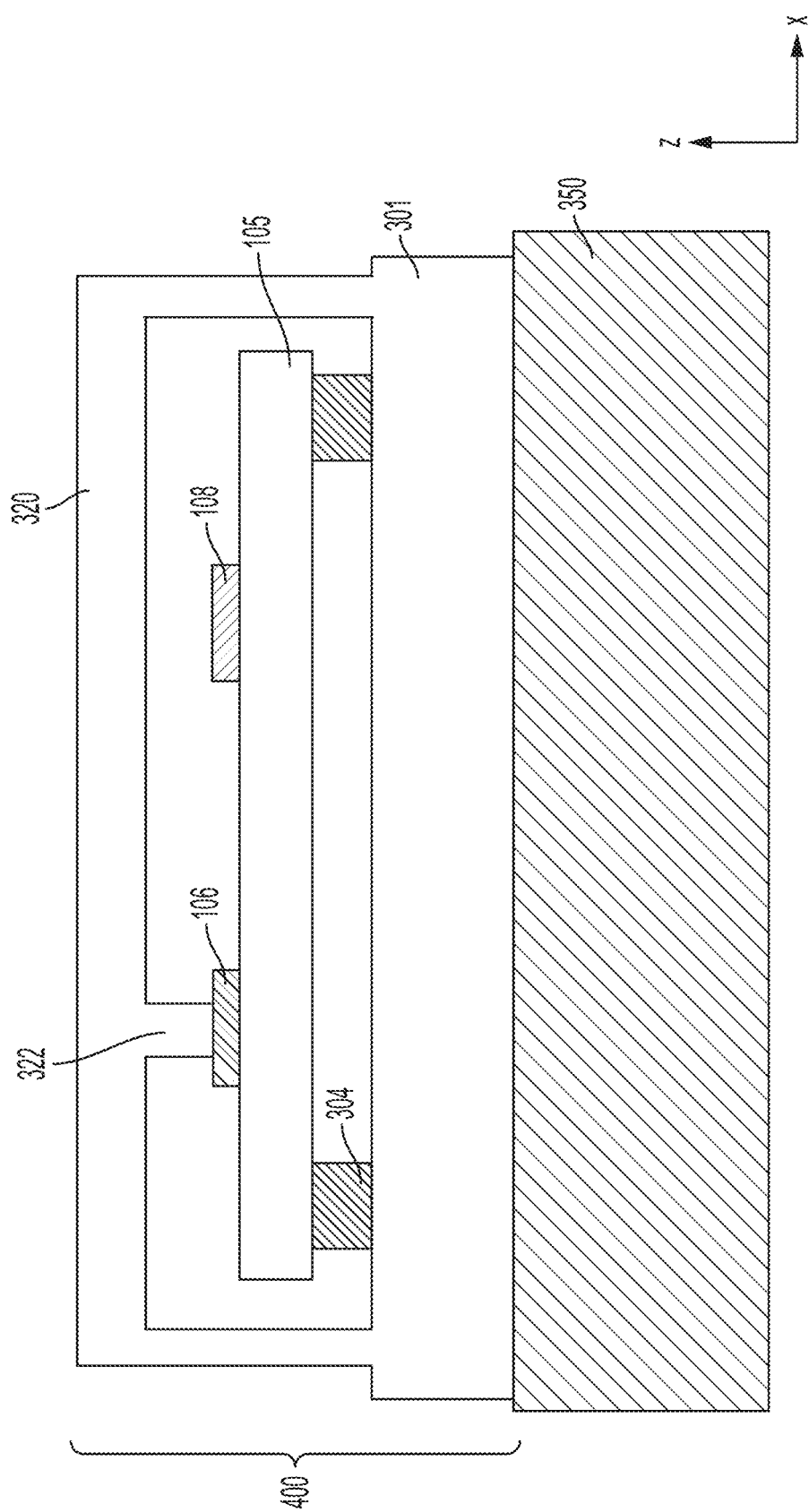
FIG. 4A is a schematic diagram illustrating another package for a wireless temperature sensor node, in accordance with some non-limiting embodiments.

FIG. 4A illustrates yet another example of a package for a wireless temperature sensor node, in accordance with some embodiments. Package 400 is disposed in contact with object 350. In this example, antenna 108 and temperature sensor 106 are disposed on the same side of circuit board 105. Thermally insulating members 304 provide thermally conductive decoupling between thermally conductive support 301 and circuit board 105. Though not illustrated in FIG. 4A, package 400 may also include electrically transparent lid 306.

In this example, thermally conductive support 301 includes thermally conductive piece 320. Thermally conductive piece 320 may be shaped to wrap around circuit board 105, so that circuit board 105 is between the base of thermally conductive support 301 and thermally conductive piece 320.

Thermally conductive piece 320 may be made of (or at least includes) a thermally conductive material, such as copper, aluminum or steel. Thermally conductive piece 320 may be formed monolithically with thermally conductive support 301, or may be formed as a separate piece to be attached to the base of thermally conductive support 301.

Thermally conductive piece 320 may include a thermally conductive protrusion 322. Thermally conductive protrusion 322 extends towards temperature sensor 106. In some embodiments, thermally conductive protrusion 322 contacts temperature sensor 106, thereby forming a low thermal resistance path between temperature sensor 106 and thermally conductive support 301.

Contacting the temperature sensor on the opposite side of the circuit board, as shown in the example of FIG. 4A, may enable a reduction in the footprint (in the xy-plane) of the base of thermally conductive member 301. As discussed in connection with the example of FIG. 3D, this reduction may be particularly beneficial in those applications in which it is important to sense the temperature of the object in real time or quasi-real time. Reducing the footprint of the base of thermally conductive member 301 leads to a reduction in the thermal mass of thermally conductive member 301, which in turn, reduces the lag with which the temperature sensor senses variations in the temperature of object 350.

Figure 4B:
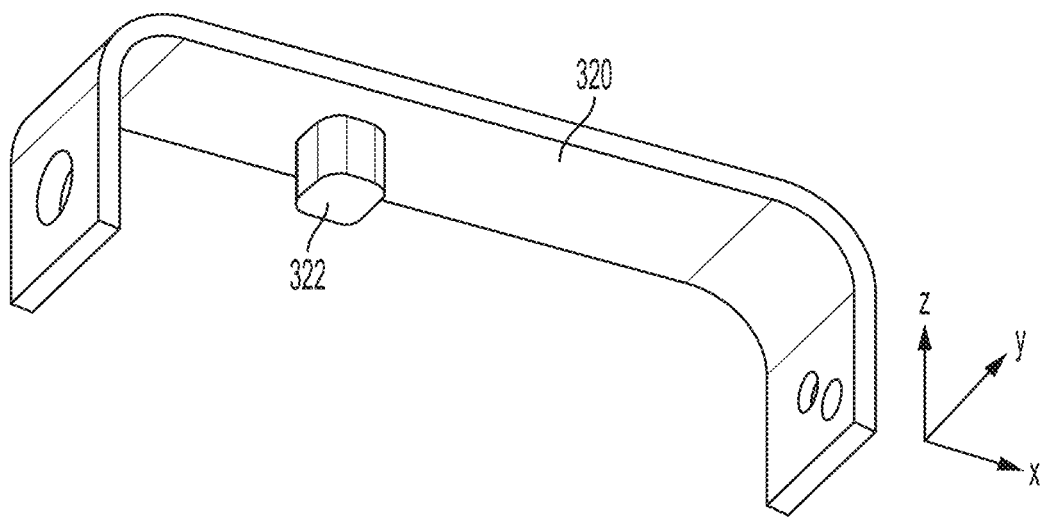
FIG. 4B is a schematic diagram illustrating a thermally conductive piece that may be used in connection with the package of FIG. 4A, in accordance with some non-limiting embodiments.

FIG. 4B illustrates a possible implementation of thermally conductive piece 320, in accordance with some embodiments. In this example, thermally conductive piece 320 is U-shaped, though not all embodiments are limited to this particular shape. Protrusion 322 extends away from thermally conductive piece 320. In some embodiments, antenna 108 may be laterally offset from thermally conductive piece 320 in the y-axis direction. In this way, the primary emission lobe of antenna 108 does not interfere with thermally conductive piece 320.

Figure 4C:
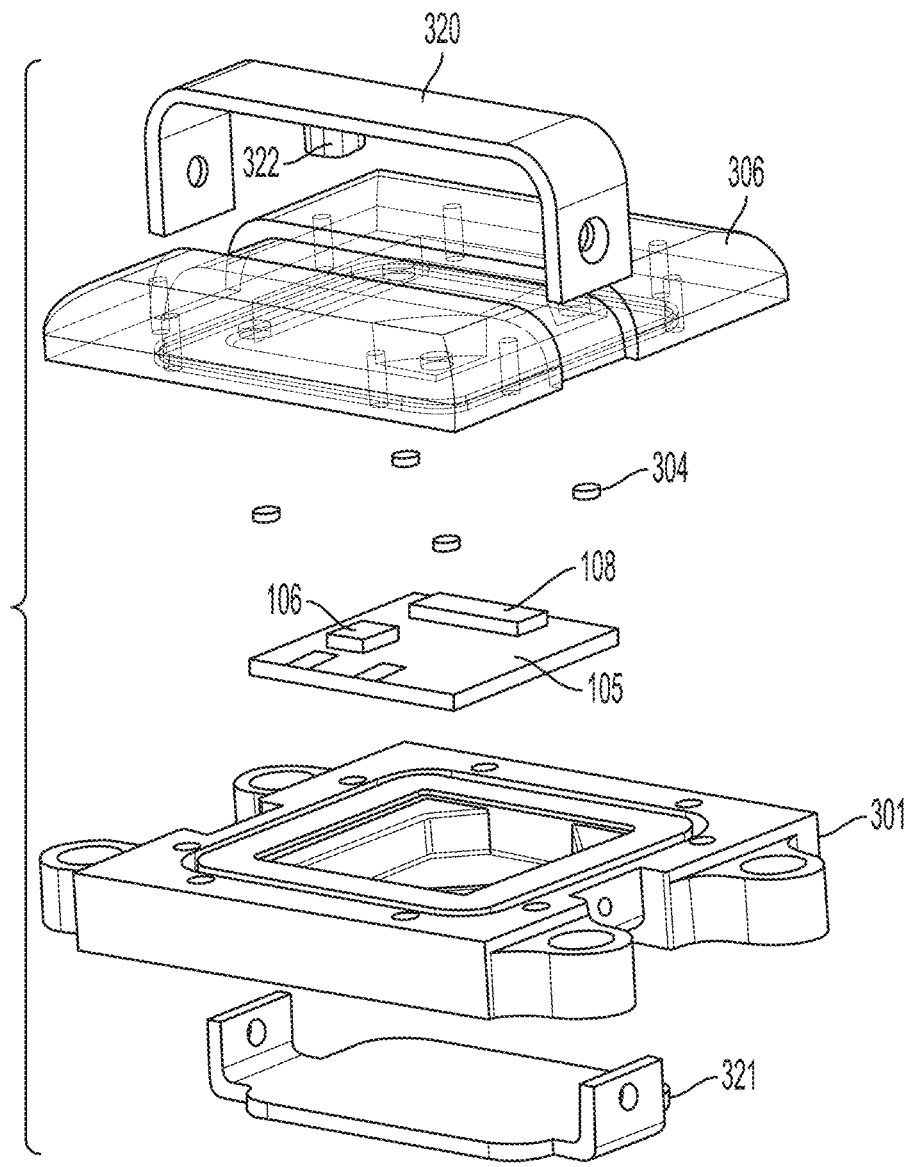
FIG. 4C is an exploded view of an implementation of the package of FIG. 4A, in accordance with some non-limiting embodiments.

FIG. 4C is an exploded view of an example of package 400, in accordance with some embodiments. This package includes a thermally conductive support 301, a circuit board 105, an electrically transparent lid 306, a thermally conductive piece 320 and a thermally conductive piece 321. Thermally conductive pieces 320 and 321 are connected together, and wrap around circuit board 105. Circuit board 105 includes antenna 108, and on the same side, temperature sensor 106. Protrusion 322 extends from thermally conductive piece 320. Thermally insulating members 304 are placed between thermally conductive support 301 and circuit board 105.

In some embodiments, a package is provided that includes means for providing a thermal path, from temperature sensor 106 to thermally conductive support 301, with a thermal resistance less than 10 K/W. Such means may include, for example, a protrusion 302 (e.g., as shown in any one of FIGS. 3A-3E) and/or a thermally conductive piece 320 wrapping around circuit board 105 (e.g., as shown in any one of FIGS. 4A-4C) and/or a protrusion 322 (e.g., as shown in any one of FIGS. 4A-4C) and/or any suitable portion of the thermally conductive support 301 in contact with temperature sensor 106.

Additionally, or alternatively, a package is provided that includes means for thermally conductively decoupling circuit board 105 from thermally conductive support 301 by at least 100 K/W. Such means may include, for example, one or more thermally insulating members 304 (e.g., as shown in any one of FIGS. 3A-3E and FIGS. 4A-4C) and/or thermally insulating support 305 (e.g., as shown in any one FIGS. 3D-3F) and/or any other thermally insulating material interposed along the conductive path from circuit board 105 to thermally conductive support 301.

IV. Applications and Benefits

Packaged wireless temperature sensor nodes of the types described herein may be used in a variety of applications. One such application is in the context of railway tracks, as illustrated in FIG. 5A. In this example, object 350 is a portion of railway track 500. A temperature sensor 106, which may be packaged with any of the packages described herein, monitors the temperature of railway track 500. Signals indicative of the sensed temperature are transmitted to one or more transceivers 102, which may disposed near the railway track, on a train 502, or in any other location. When on a train, transceiver 102 may communicate with temperature sensor 106 as the train passes over the temperature sensor. Monitoring the temperature of railway tracks may be important in the prevention of train derailments. Railway tracks are generally formed by disposing several discrete track segments in line. The spacing between the end of one track segment and the beginning of the following track segment may be temperature-dependent. As the temperature of a track segments increases, due for example to the passage of a train, the track segment expands. As a result, the spacing between contiguous track segments reduces. The cause of some past train derailment has been attributed to such variations in the spacing between adjacent track segments. For this reason, monitoring the temperature of a railway track is of particular importance. Further, because of the high velocity with which trains pass over a particular portion of a railway track, it is important that the temperature be sensed in real time or quasi-real time.

Figure 5B:
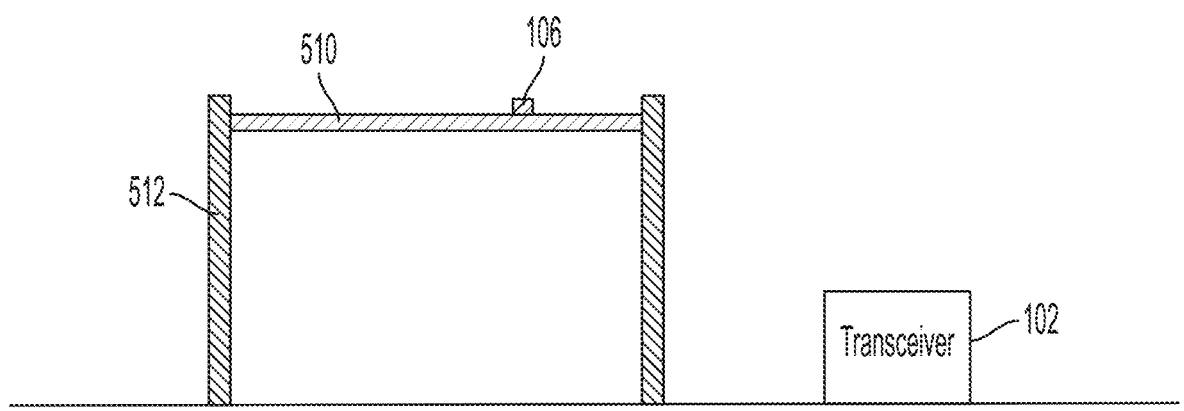
FIG. 5B is a schematic diagram illustrating a wireless temperature sensor node used in connection with of busbars, in accordance with some non-limiting embodiments.

Another application is in the context of busbars, as illustrated in FIG. 5B. Busbars 510 include metallic strips or bars for local high current power distribution. Busbars 510 are generally uninsulated, and are supported in air by insulated pillars 512. Currents flowing through a busbar increase the temperature of the busbar. Over time, these temperature increases may damage the busbar, thus decreasing its lifetime. A temperature sensor 106, which may be packaged with any of the packages described herein, monitors the temperature of busbar 510. Signals indicative of the sensed temperature are transmitted to transceiver 102.

In another example, packaged wireless temperature sensor nodes of the types described herein may be used in agricultural applications, for example to monitor the temperature of a piece of agricultural equipment. In another example, packaged wireless temperature sensor nodes of the types described herein may be attached to the wheel of a vehicle (e.g., a car or a truck) to monitor the temperature of the wheel.

Aspects of the technology described herein may provide one or more benefits, some of which have been previously described. Now described are some examples of such benefits. It should be appreciated that not all aspects and embodiments necessarily provide all of the benefits now described. Further, it should be appreciated that aspects of the technology described herein may provide additional benefits to those now described.

Aspects of the technology described herein provide packages for wireless temperature sensor nodes with relatively low thermal resistance between the object to be sensed and the temperature sensor, thereby improving the sensitivity of the sensor. Further aspects of the technology described herein provide packages with relatively high thermal resistance between the antenna and the object, thereby reducing thermal distortions due to heat produced by the antenna. Further aspects of the technology described herein provide packages with shock absorbers, thereby decreasing the likelihood of damage to the package, and decreasing the likelihood that the temperature sensor disconnect from the thermally conductive support or that the thermally conductive support disconnect from the object. Further aspects of the technology described herein provide packages having supports with relatively low thermal masses, thereby enabling temperature measurements in real time or quasi-real time.

What is claimed is:

1. A package for a wireless temperature sensor node, the package comprising:
a circuit board;
a temperature sensor disposed on the circuit board;
an antenna electrically coupled to the temperature sensor, wherein the temperature sensor is disposed on a first side of the circuit board and the antenna is disposed on a second side, opposite the first side, of the circuit board;

an electrically transparent lid, wherein the first side of the circuit board faces away from the electrically transparent lid and the second side of the circuit board faces towards the electrically transparent lid; and a thermally conductive support, wherein:

the thermally conductive support is in thermal contact with the temperature sensor and the thermally conductive support is thermally conductively decoupled from the circuit board.

2. The package of claim 1, wherein the thermally conductive support comprises a thermally conductive base and a thermally conductive protrusion extending from the thermally conductive base, the thermally conductive protrusion being in thermal contact with the temperature sensor.

3. The package of claim 1, further comprising a thermally insulating support disposed adjacent to the thermally conductive support, wherein the circuit board rests on the thermally insulating support.

4. The package of claim 1, wherein the circuit board is coupled to the thermally conductive support at least through one or more thermally insulating members.

5. The package of claim 4, wherein the one or more thermally insulating members are compressible.

6. The package of claim 4, wherein the one or more thermally insulating members comprise one or more o-rings.

7. A package for a wireless temperature sensor node, the package comprising:

a circuit board;

one or more thermally insulating members;

a temperature sensor disposed on the circuit board;

an antenna electrically coupled to the temperature sensor; and a thermally conductive support, wherein:

the thermally conductive support is in thermal contact with the temperature sensor, the circuit board is coupled to the thermally conductive support at least through the one or more thermally insulating members, and the circuit board is further coupled to the thermally conductive support through a thermally insulating support disposed adjacent to the thermally conductive support.

8. The package of claim 7, wherein the thermally insulating support encloses the thermally conductive support.

9. The package of claim 7, wherein the one or more thermally insulating members are compressible.

10. The package of claim 7, wherein the thermally conductive support comprises a thermally conductive base and a thermally conductive protrusion extending from the thermally conductive base, the thermally conductive protrusion being in thermal contact with the temperature sensor.

11. The package of claim 7, wherein the temperature sensor is disposed on a first side of the circuit board and the antenna is disposed on a second side, opposite the first side, of the circuit board.

12. The package of claim 11, further comprising an electrically transparent lid, wherein the first side of the circuit board faces away from the electrically transparent lid and the second side of the circuit board faces towards the electrically transparent lid.

13. A package for a wireless temperature sensor node, the package comprising:

a circuit board;

a temperature sensor disposed on the circuit board;

an antenna electrically coupled to the temperature sensor;

a thermally conductive support;

means for providing a thermal path, from the temperature sensor to the thermally conductive support, with a thermal resistance less than 10 K/W; and means for thermally conductively decoupling the circuit board from the thermally conductive support by at least 100 K/W, wherein the means for thermally conductively decoupling the circuit board from the thermally conductive support comprises:

a compressible thermally insulating member in contact with the circuit board; and a thermally insulating support in contact with the compressible thermally insulating member and the thermally conductive support.

14. The package of claim 13, wherein the means for providing the thermal path comprises a thermally conductive protrusion extending from the thermally conductive support and in contact with the temperature sensor.

\* \* \* \* \*